United States Patent [19]
Lewis et al.

[11] Patent Number: 5,422,751
[45] Date of Patent: Jun. 6, 1995

[54] LIQUID CRYSTAL DISPLAY ASSEMBLY EMPLOYING FRONT BEZEL, FRAME HOLDING LIQUID CRYSTAL CELL ATTACHED TO BEZEL, AND LIGHT SOURCE AND BACK PLATE ATTACHED TO BEZEL

[75] Inventors: William J. Lewis, Mt. View; William J. Schonfeld; Robert Ricommini, both of Saratoga; Vijay Char, San Jose, all of Calif.

[73] Assignee: Apple Computer, Inc., Cupertino, Calif.

[21] Appl. No.: 959,861

[22] Filed: Oct. 14, 1992

[51] Int. Cl.[6] .................. G02F 1/1333; G02F 1/1335
[52] U.S. Cl. ...................................... 359/83; 359/48; 361/681
[58] Field of Search .................. 354/83, 88, 48, 49, 354/50; 361/380, 392, 391, 681; 362/26, 31

[56] References Cited

U.S. PATENT DOCUMENTS

| | | | |
|---|---|---|---|
| 4,772,100 | 9/1988 | Suenaya | 359/83 |
| 4,789,224 | 12/1988 | Boughsky | 359/83 |
| 4,796,977 | 1/1989 | Drake | 359/83 |
| 5,030,943 | 7/1991 | Anglin | 359/49 |
| 5,146,354 | 9/1992 | Plesinger | 359/49 |
| 5,150,231 | 9/1992 | Iwamoto | 359/83 |
| 5,182,660 | 1/1993 | Tanaka | 359/49 |
| 5,195,822 | 3/1993 | Takahashi et al. | 362/296 |
| 5,196,993 | 3/1993 | Herron et al. | 361/393 |
| 5,264,992 | 11/1993 | Hogdahl et al. | 361/681 |
| 5,299,038 | 3/1994 | Hamada et al. | 359/49 |
| 5,333,073 | 7/1994 | Suzuki | 359/83 |
| 5,335,100 | 8/1994 | Obuta | 359/49 |

FOREIGN PATENT DOCUMENTS

| | | |
|---|---|---|
| 0002127 | 1/1986 | Japan . |
| 0093425 | 4/1990 | Japan . |

Primary Examiner—William L. Sikes
Assistant Examiner—Kenneth Parker
Attorney, Agent, or Firm—Richard C. Liu

[57] ABSTRACT

The use of a single metal mounting frame within an LCD assembly having an outer plastic housing provides for a thin, light, rigid, and less expensive LCD assembly. The metal mounting frame is coupled to a bezel and aligns an LCD panel between the bezel and the mounting frame. A backlighting assembly which provides illumination for the LCD panel is aligned by the mounting frame and the bezel and is aligned between the mounting frame and a plastic cover panel. The plastic cover panel couples to the bezel to form the outer housing of the LCD assembly.

20 Claims, 6 Drawing Sheets

LIQUID CRYSTAL DISPLAY ASSEMBLY EMPLOYING FRONT BEZEL, FRAME HOLDING LIQUID CRYSTAL CELL ATTACHED TO BEZEL, AND LIGHT SOURCE AND BACK PLATE ATTACHED TO BEZEL

BACKGROUND OF THE INVENTION

This invention is in the field of computer displays and methods for their manufacture. Specifically, a first embodiment of the present invention relates to a liquid crystal display ("LCD") and a method for its assembly.

LCDs are commonly used in portable computers, calculators and other small, microprocessor controlled devices for the display of data and graphics generated by the devices to which they are coupled. These displays are known in the industry and generally function adequately.

Although known LCDs are adequate to their tasks, they share some common problems. Known displays are generally thicker than desired, a result of a complicated method of construction. The same defects in the construction process result in an LCD assembly that is not as strong as desired. Given that the display qualities of an LCD panel can be seriously affected by twisting the panel, the lack of strength in known panels is a serious problem. Finally, the complexity of the construction process increases the cost of the assembled panel.

FIGS. 1 through 4 show how a known LCD panel is constructed. FIG. 1 is an exploded isometric drawing of the panel's backlighting system. Backlighting assembly 10 centers around backlighting panel 11, which distributes the light generated by fluorescent light fixture 19 across the entire LCD panel. Backlighting panel 11 is set into plastic end pieces 13 and 14. Mounting flanges in pieces 13 and 14 hold panel 11 in proper alignment. Fluorescent light fixture 19 is placed in end piece 13, abutting backlighting panel 11. Backlighting assembly 10 is held together by metal frame pieces 16, 17, and 18 which overlap the edges of panel 11. Frame piece 17 is shaped to accommodate fixture 19. When frame pieces 16, 17, and 18 are screwed to plastic end pieces 13 and 14 using screws 12, assembly 10 is held together as a single unit. FIG. 1a details how light fixture 19, end piece 13, and backlighting panel 11 are held together by metal frame pieces 17 and 18.

FIG. 2 is an exploded isometric drawing showing how LCD panel 20, with its supporting electronics, is mounted atop backlighting assembly 10. Hole 21 in LCD panel 20 aligns with peg 22 on assembly 10 and insures proper alignment of panel 20 with backlighting assembly 10. This alignment feature is shown in detail in FIG. 2a.

FIG. 3 is an exploded isometric drawing showing how metal frame 30 is mounted over the backlighting assembly 10 and LCD panel 20 combination. Not shown are several strips of gasket material which are placed between the LCD panel and the metal frame to protect the panel from damage. Tabs 31 on frame 30 are crimped against the LCD panel/backlighting assembly to form a single unit. This finished unit is shown in FIG. 4.

The unit shown in FIG. 4 is, unfortunately, not ready for use in a portable computer or other computer-based system. Typically it is mounted in a plastic casing having a front bezel and a rear back piece. The plastic casing can be held together in any one of several ways, including screws and plastic rivets. Only after the assembly shown in FIG. 4 has been mounted in such a casing can it be used in a portable computer system. To reduce or eliminate electromagnetic interference ("EMI"), EMI shields may be needed. These shields, which typically comprise a thin sheet plastic coated with an electrical conductor, would encapsulate the finished module and would fit between the module and its plastic casing.

Although the display manufacturing process and the finished display shown in FIGS. 1 through 4 is acceptable, it is also complex, has many parts, and still requires further assembly before it can be used in an actual computer system. In particular, the metal frame and the plastic case are somewhat redundant. A simpler assembly process, requiring fewer parts to produce a usable LCD would be very desirable.

SUMMARY OF THE INVENTION

In its first embodiment, the present invention comprises an LCD assembly assembled using an integrated plastic bezel and rear panel. Total part count is reduced, the finished LCD assembly requires no further assembly before it can be used in a portable computer, and the finished LCD assembly is stronger, lighter and thinner than known LCD modules that have been encased in a plastic housing.

The present invention will now be described with reference to the figures listed and described below.

BRIEF DESCRIPTION OF THE ILLUSTRATIONS

FIG. 1a is a detail of the assembly shown in FIG. 1 (prior art);

DETAILED DESCRIPTION OF THE PREFERRED EMBODIMENT

Figure 1:
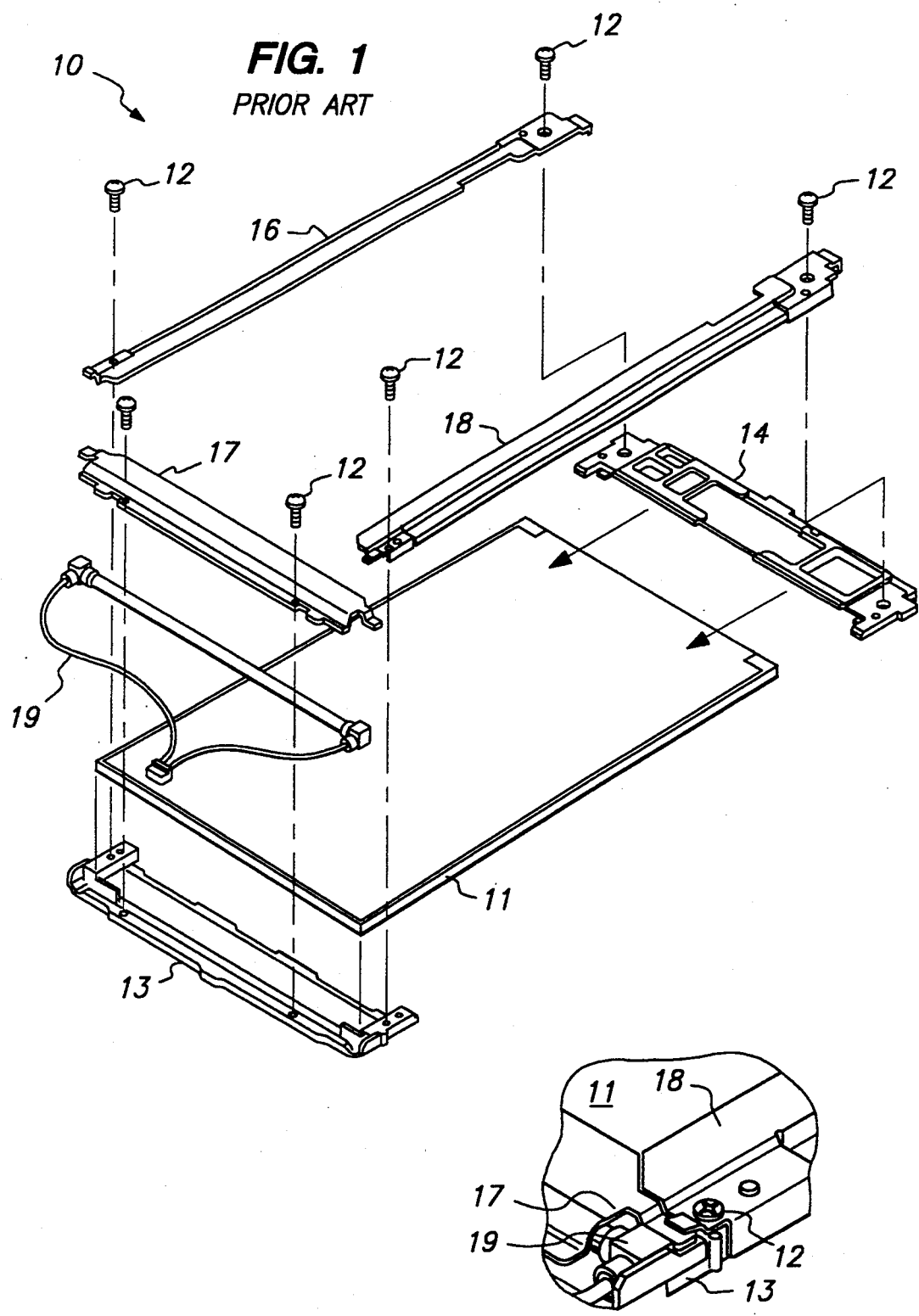
FIG. 1 is an exploded isometric drawing of a backlighting assembly (prior art)
Figure 2:
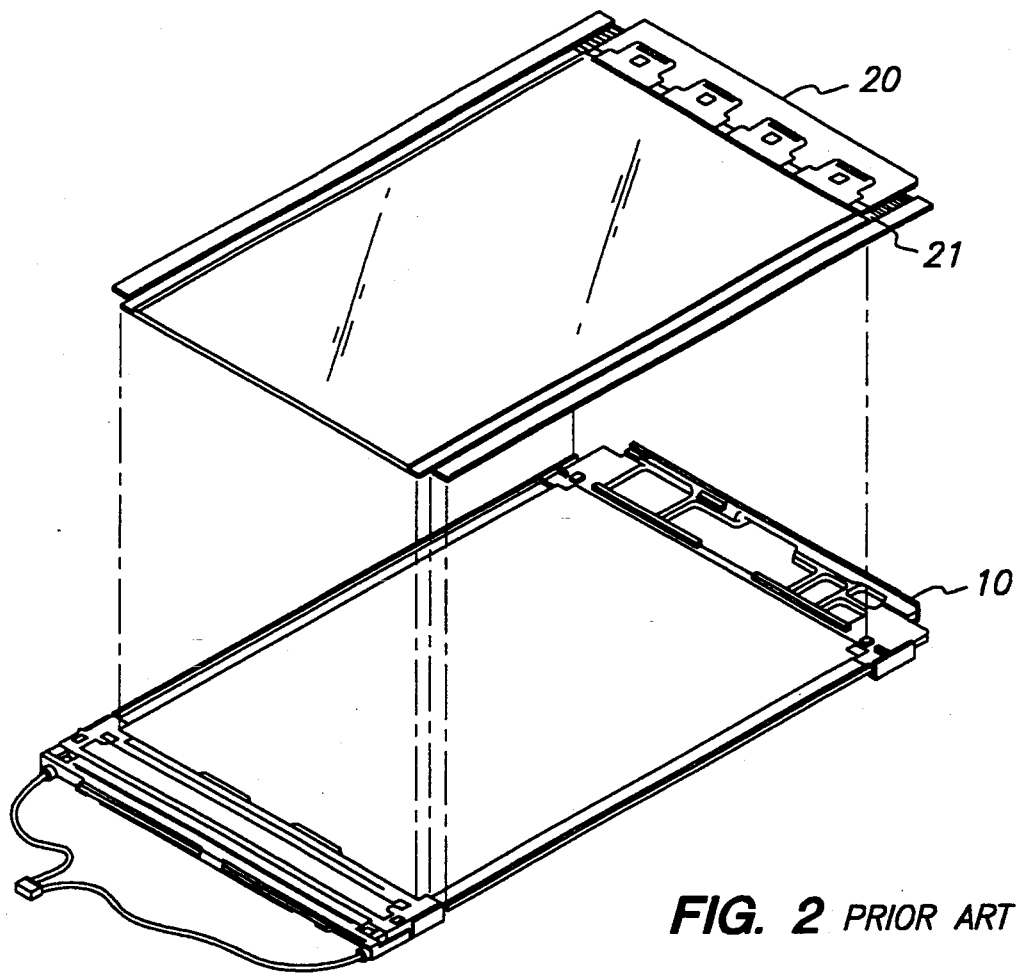
FIG. 2 is an exploded isometric drawing showing how an LCD panel is mounted on the assembly shown in FIGS. 1 and 1a (prior art)
Figure 2A:
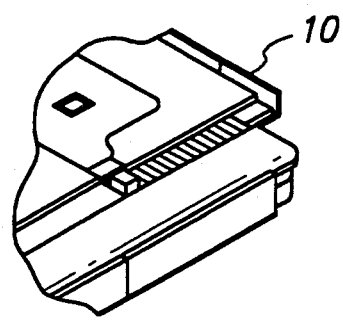
FIG. 2a is a detail of FIG. 2 showing how the alignment of the LCD panel is achieved (prior art)
Figure 3:
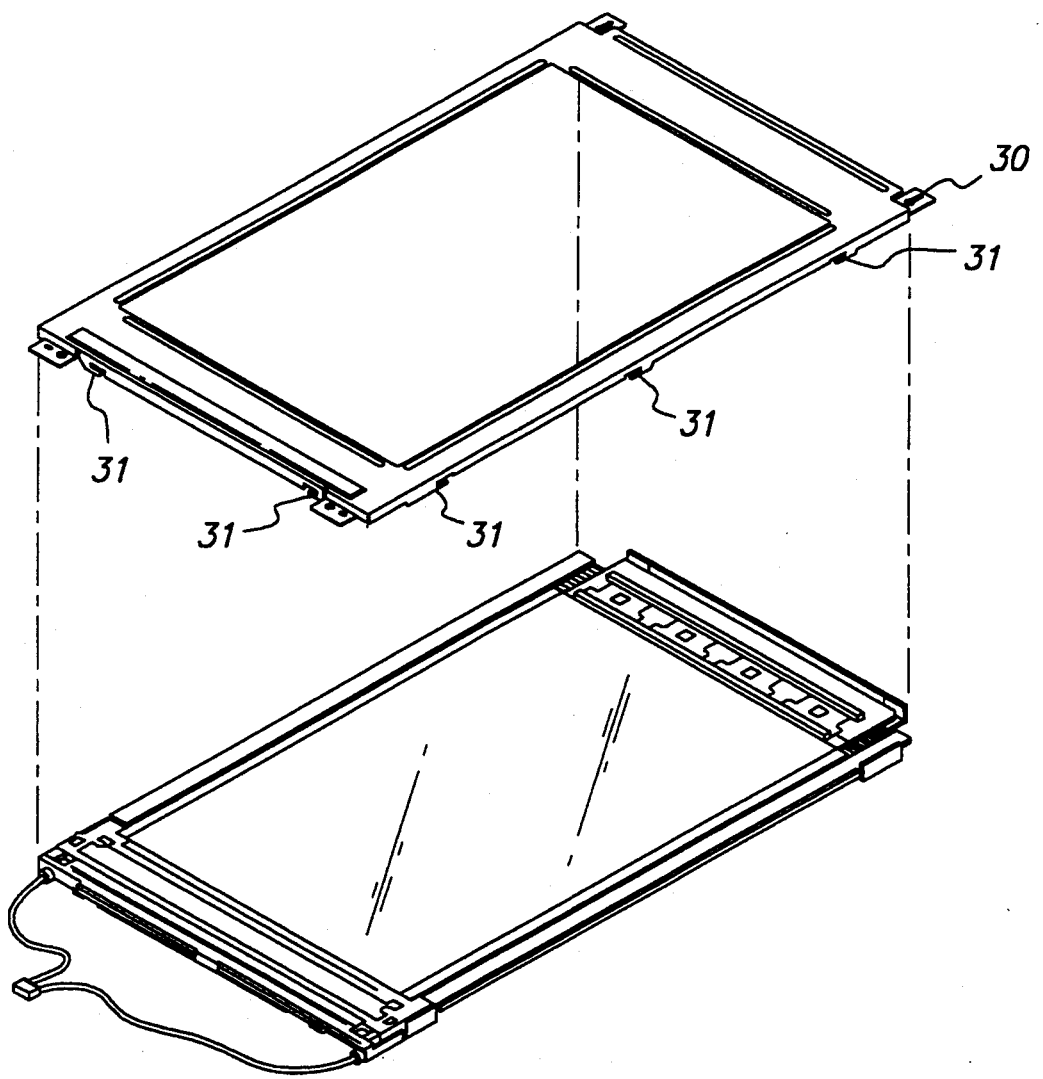
FIG. 3 is an exploded isometric drawing showing how a frame is mounted on the assembly and panel shown in FIG. 2 (prior art)
Figure 4:
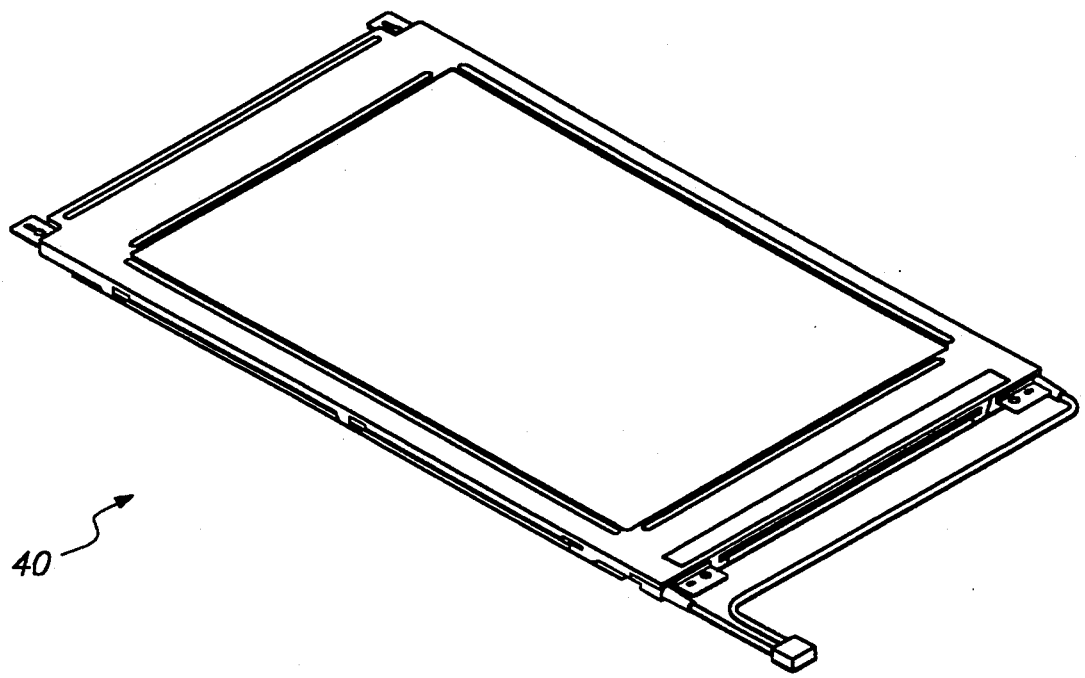
FIG. 4 shows the assembled LCD panel (prior art)
Figure 5:
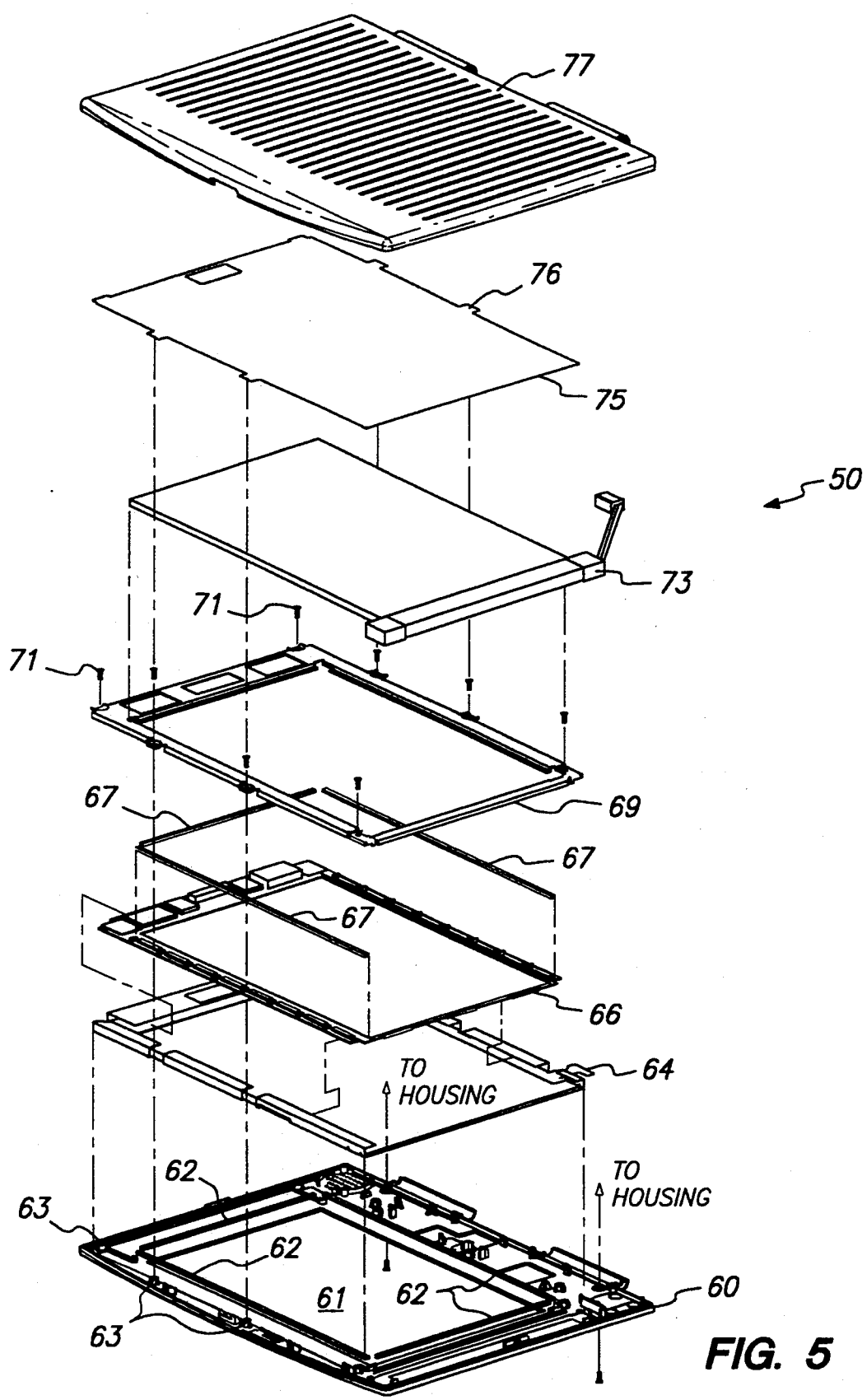
FIG. 5 is an exploded isometric drawing showing the assembly of the present invention.

FIG. 5 is an exploded isometric drawing showing the components of a first embodiment of the present invention and the manner with which those components are assembled.

Front plastic bezel 60 is the structural backbone of the present invention. Mounting alignment fixtures 65 are molded in bezel 60 to insure proper alignment of the various components. Screw holes 63 allow various components of the present invention to be fastened to bezel 60 with screws 71. Bezel 60 is generally rectangular in shape, with central display area opening 61. The edge of central opening 61 is lined with gasket material 62. EMI protection sheet 64 is placed around gasket material 62 and completely surrounds display area opening 61. LCD panel and supporting electronics 66 is placed on top of EMI protection sheet 64, the edges of sheet 64 folding up and over the supporting electronics on panel 66. Additional strips of gasket material 67 are placed in the small strip-like areas between the electronics surrounding the LCD panel and the LCD panel itself.

Metal frame 69 mounts over gasket material 67, LCD panel and electronics 66 and EMI sheet 64 and is attached to bezel 60 by means of screws 71 which screw into screw holes 63. Combination backlighting panel and fluorescent light fixture 73 is placed on top of frame 69 and is held in proper alignment by a metal flange 70 formed in frame 69 and by locating features formed in plastic bezel 60. Second EMI protection sheet 75 fits over panel/light 73, tabs 76 on sheet 75 fitting into slots in shield 64. Finally rear plastic panel 77 is placed atop panel/light 73 and is then hooked and screwed to bezel 60, forming a finished LCD assembly.

Figure 6:
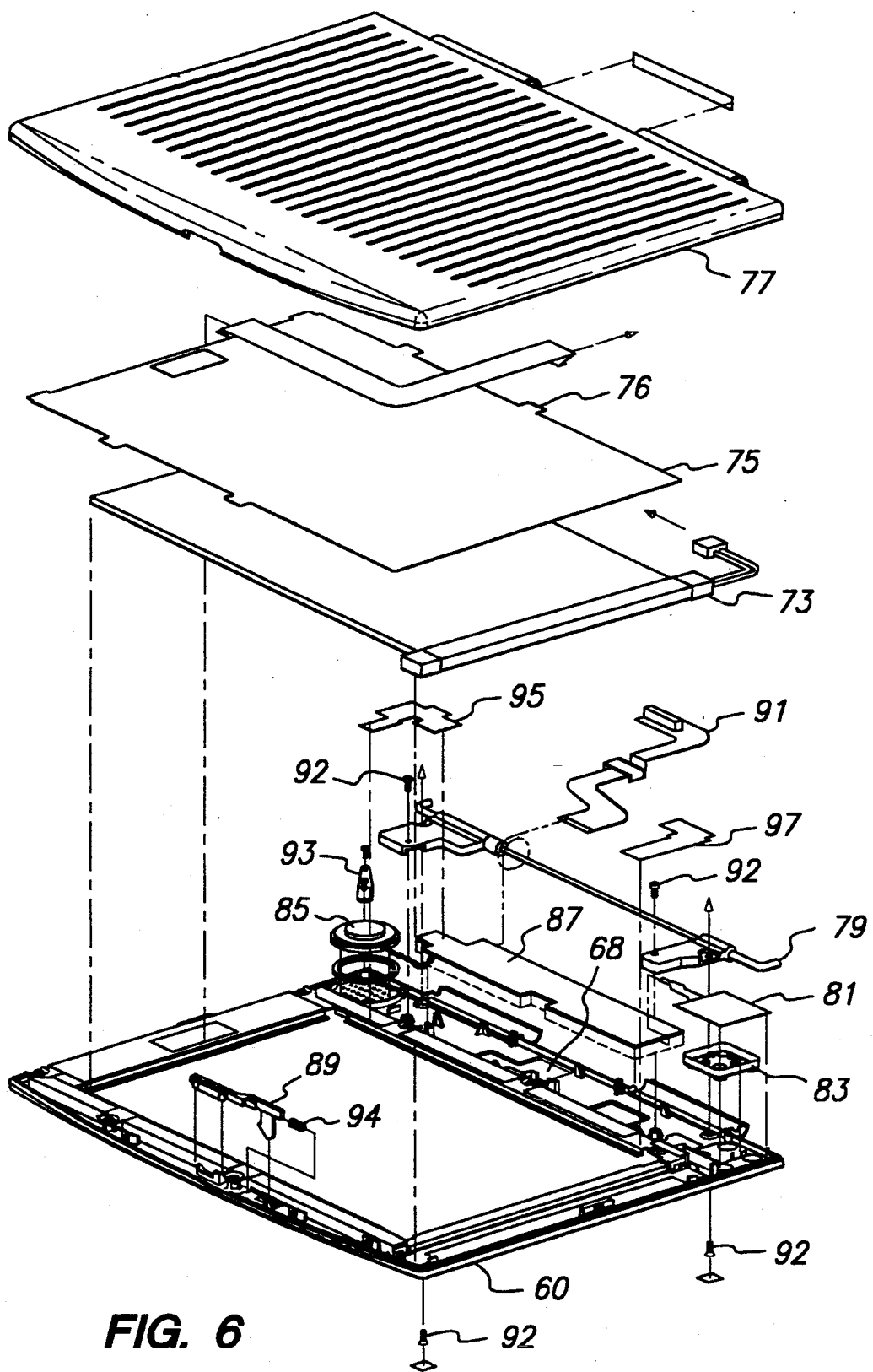
FIG. 6 is a second exploded isometric drawing of the present invention.

FIG. 6 illustrates how the present invention accommodates the mounting of various components which support the LCD's operation. Printed circuit board 87 is mounted in circuit mounting area 68 in front bezel 60. Circuit board 87 comprises a DC/AC power supply for powering fluorescent light fixture 73, a DC/DC power supply which powers LCD panel 66, speaker interface electronics, speaker power supply, and brightness and contrast interface and control electronics. Speaker 85 is held in front bezel 60 by means of speaker mounting hardware 93 and is coupled to the speaker interface electronics and power supply on circuit board 87. Brightness and contrast control buttons 81 are coupled to the brightness and contrast interface and control electronics on board 87 and are held in position on front bezel 60 by means of brightness and contrast control housing 83. Clutch mechanism 79 is also mounted on front bezel 60 by means of a plurality of screws 92 and determines the opening and positioning of the LCD display when it is attached to a computer. Latch 89, for keeping the LCD in a closed position, attaches to bezel 60 and is spring-loaded by spring 94. EMI sheets 95 and 97 cover parts of clutch 79 and flex cable 91 couples the completed LCD assembly to the computer.

Several innovations involved in the described construction of the present invention should be highlighted. First, a single piece frame 69 is used to fasten the LCD assembly to the front bezel 60. This provides greater rigidity and consequential higher torque resistance. Instead of a first three piece metal frame and then a second single piece metal frame, the present invention only one single piece metal frame. This construction also makes removing and replacing the backlighting assembly much simpler than in known LCD assemblies. Finally, the plastic bezel 60 and rear panel 77 are integral structural members of the present invention, not merely added on as in the known art. All these innovations result in a finished LCD panel display that is thinner, lighter and more rigid than those known in the art, which also has fewer parts and is easier and less expensive to build.

Although the invention has been explained with reference to the foregoing embodiment, it should be apparent to one of skill in the art that numerous changes and modifications may be made thereto without departing from the scope or spirit of the invention. These changes, modifications and applications of the invention will become apparent to one skilled in the art in view therefore of this disclosure. Thus, the invention should be limited only in accordance with the appended claims.

What is claimed is:

1. A liquid crystal display ("LCD") assembly comprising:
   (a) a display bezel having a generally rectangular shape with a generally rectangular central opening, the bezel having an outer and inner surface, the inner surface having a plurality of attachment means and alignment fixtures thereon;
   (b) an LCD panel for displaying alphanumeric or graphic computer data, the LCD panel being held in a first aligned position atop the inner surface of the bezel by means of a first set of alignment features;
   (c) a mounting frame for holding the LCD panel in place and for providing structural rigidity to the LCD assembly, the mounting frame having a flange which surrounds the LCD panel, the frame being attached to the bezel by a plurality of screws which screw into a first set of the attachment means;
   (d) a backlighting panel for providing illumination for the LCD panel, the backlighting panel supported by contact with the LCD panel and the mounting frame and being held in alignment by a second set of alignment features in the bezel; and
   (e) a rear panel which mounts atop the backlighting panel and which is connected to the bezel by clips and screws which screw into a second set of attachment means on the inner surface of the bezel, the rear panel forming with the bezel the outer housing of the LCD assembly.

2. The LCD assembly of claim 1 wherein a first electromagnetic interference ("EMI") shield is placed around the perimeter of the LCD panel and a second EMI shield is placed behind the backlighting panel, the first and second shields cooperating to form an EMI shield around electronically active components of the LCD assembly.

3. The LCD assembly of claim 1, wherein the display bezel comprises plastic, wherein the rear panel comprises plastic, and wherein the mounting frame comprises metal.

4. The LCD assembly of claim 1, wherein the mounting frame is the only mounting frame between the display bezel and the rear panel.

5. The LCD assembly of claim 1, wherein the backlighting panel is held in alignment by the flange of the mounting frame.

6. A method for assembling a liquid crystal display (LCD) assembly, the LCD assembly having a front bezel, an LCD panel, a metal frame, a backlighting assembly and a rear panel, the method comprising the steps of:
   (a) placing the LCD panel into the front bezel, the LCD panel being held in a first aligned position by means of a first set of alignment fixtures in the front bezel;
   (b) locking the LCD panel into position by placing the metal frame around it and attaching the metal frame to the bezel by means of screws, the metal frame having a flange which overlaps the perimeter of the LCD panel and which holds the LCD panel in position when the frame is screwed to the bezel;
   (c) placing the backlighting assembly atop the LCD panel, the backlighting assembly being held in a second aligned position by means of a second set of alignment fixtures in the front bezel; and (d) locking the backlighting assembly into position by placing the rear panel atop the backlighting assembly and attaching the rear panel to the bezel by means of both screws which screw into a second set of attachment fixtures in the bezel and hook means in the rear panel which attach to the sides of the bezel.

7. The method of claim 6 further comprising the steps of surrounding the perimeter of the LCD panel with a first electromagnetic interference ("EMI") shield and placing a second EMI shield between the backlighting assembly and the rear panel, the first and second shield providing EMI shielding for electrically active components of the LCD assembly.

8. The method of claim 6, wherein the front bezel comprises plastic and wherein the rear panel comprises plastic.

9. The method of claim 6, wherein step (c) comprises the step of aligning the backlighting assembly in the flange of the metal frame.

10. A liquid crystal display assembly, comprising:
(a) a bezel having attachment features and alignment features;
(b) a liquid crystal display panel for displaying information;
(c) a unitary mounting frame coupled to a first set of the attachment features of the bezel such that the liquid crystal display panel is aligned between the bezel and the mounting frame within the liquid crystal display assembly;
(d) a backlighting assembly for providing illumination for the liquid crystal display panel, the backlighting assembly aligned within the liquid crystal display assembly by the mounting frame and by a set of the alignment features of the bezel; and
(e) a cover panel coupled to a second set of the attachment features of the bezel such that the backlighting assembly is aligned within the liquid crystal display assembly between the mounting frame and the cover panel such that the liquid crystal display panel, the mounting frame, and the backlighting panel are aligned within the liquid crystal display assembly between the bezel and the cover panel, and such that the attachment and alignment features operatively combined to allow removal of the cover panel without causing misalignment of the liquid crystal display panel.

11. The liquid crystal display assembly of claim 10, wherein the mounting frame is coupled by screws to the first set of the attachment features of the bezel.

12. The liquid crystal display assembly of claim 10, wherein the mounting frame comprises a flange and wherein the backlighting assembly is aligned by the flange of the mounting frame.

13. The liquid crystal display assembly of claim 10, wherein the bezel comprises plastic and wherein the cover panel comprises plastic.

14. The liquid crystal display assembly of claim 10, wherein the mounting frame comprises metal.

15. The liquid crystal display assembly of claim 14, wherein the bezel comprises plastic and wherein the cover panel comprises plastic.

16. The liquid crystal display assembly of claim 14, wherein the mounting frame is the only mounting frame between the bezel and the cover panel.

17. The liquid crystal display assembly of claim 15, wherein the mounting frame is the only mounting frame between the bezel and the cover panel.

18. The liquid crystal display assembly of claim 10, further comprising
(f) a first electromagnetic interference protection sheet aligned within the liquid crystal display assembly between the bezel and the liquid crystal display panel; and
(g) a second electromagnetic interference protection sheet aligned within the liquid crystal display assembly.

19. The liquid crystal display assembly of claim 18, wherein the second electromagnetic interference protection sheet is aligned within the liquid crystal display assembly between the backlighting assembly and the cover panel;
wherein the first electromagnetic interference protection sheet includes alignment features;
wherein the second electromagnetic interference protection sheet includes alignment features; and
wherein the second electromagnetic interference protection sheet is aligned within the liquid crystal display assembly by the alignment features of the first electromagnetic interference protection sheet and by the alignment features of the second electromagnetic interference protection sheet.

20. The liquid crystal display assembly of claim 10, wherein the mounting frame is the only mounting frame between the bezel and the cover panel.

* * * * *